(No Model.)
H. KOEHLER.
PROCESS OF REFINING PETROLEUM.
No. 507,441. Patented Oct. 24, 1893.
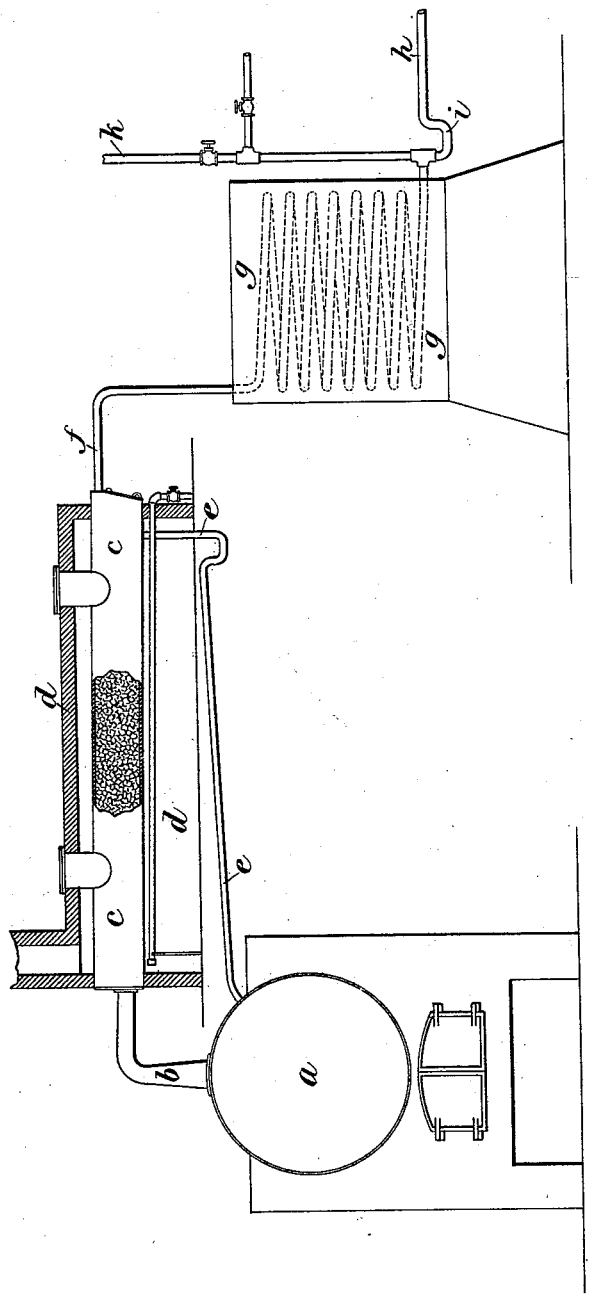
WITNESSES
INVENTOR
Hermann Koehler
by his attorneys
W. Bakewell & Sons

UNITED STATES PATENT OFFICE.

HERMANN KOEHLER, OF LONG ISLAND CITY, ASSIGNOR TO THE STANDARD OIL COMPANY, OF NEW YORK, N. Y.

PROCESS OF REFINING PETROLEUM.

SPECIFICATION forming part of Letters Patent No. 507,441, dated October 24, 1893.

Application filed September 3, 1889. Serial No. 322,824. (No specimens.)

*To all whom it may concern:*

Be it known that I, HERMANN KOEHLER, of Long Island City, (Ravenswood,) in the county of Queens and State of New York, have invented a new and useful Improvement in Refining Petroleum, of which the following is a full, clear, and exact description.

My invention relates to an improved method of refining, deodorizing and purifying petroleum, and especially those kinds of petroleum known as Canadian oil and Lima oil. These oils contain a very large percentage of sulphur, usually over one-half of one per centum, the sulphur existing in the oil partly in a condition capable of separation by distillation and sulphuric acid treatment, and partly in that of various sulphur compounds which are not broken up, or at least only partially so, by distillation, so that it has been found impossible by the ordinary processes used in distilling petroleum to purify these oils therefrom sufficiently to produce a merchantable article. A distinguishing characteristic of these Canadian, Lima, and similar oils is a peculiarly disgusting and offensive odor, which exists not only in the crude oil, but seems to be developed and rendered stronger and more penetrating when the oil is distilled. Certain processes have been employed, with more or less success, for deodorizing these oils, such as treating the distillate with plumbate of soda. This and other similar processes have been effective in removing the offensive smell from the distillate, and perhaps in removing also a portion of the free sulphur, but which only partially, if at all, break up the sulphur compounds, so that, although the odor and color of the burning oil distillate may be good, the oil when burned gives off sulphuric acid by the union of oxygen with the sulphur, and the chimneys of the lamps become coated with a black deposit, and, if the oil is burned slowly or with a low flame in the lamp, the offensive smell is very perceptible; all of which facts show that the ordinary so-called "lead treatment" will not break up and remove the sulphur compounds. The consequence is that the refined oil produced by these prior modes of treatment to which I have referred, is practically useless and unmerchantable for illuminating purposes.

My invention is based on a discovery which I have made that the sulphur present in Lima oils and petroleum of that general character exists in various conditions of mixture or combination, a portion only of which will yield to the plumbate of sodium treatment as heretofore ordinarily practiced, while usually the larger portion will not yield to such treatment.

The object of my improvement is to effect the elimination of the sulphur found in Lima oil and other petroleums of that class by first reducing the refractory sulphur compound or compounds contained therein to what I conceive to be a more simple condition of combination, by means of the treatment hereinafter described, so that the sulphur remaining in the resulting distillate will be in such a condition as to be readily removed by further treatment such as redistillation, the plumbate of soda treatment, or by means of sulphuric acid and alkali as heretofore practiced.

I will now proceed to describe my invention, reference being had to the accompanying drawing forming a part of this specification, which represents an elevation of the apparatus which I employ.

In the drawing, *a* represents a still for distilling petroleum, which may be of any ordinary or desired construction or size and heated by a furnace or otherwise. The goose-neck *b* conducts the vapors of distillation into the interior of the vapor pipe *c*, which may be of cylindrical shape and conveniently placed horizontally as shown, or, if preferred, the chamber may be placed in an upright position, the necessary changes in the arrangement of the flue and pipes being made to suit the altered condition. This chamber may be heated by a gas pipe, by a furnace *d*, by steam pipes, or in any other convenient manner, as for example, by a flue from the fire chamber of the still *a*, and in use is kept at a suitable temperature, which is best ascertained in the manner hereinafter stated, usually ranging from 600° to 1,000° Fahrenheit. The chamber *c* is furnished with suitable man-holes on top, through which broken quick lime is introduced until the chamber is filled, the lime being loosely disposed so as to permit of the free passage of the vapor of distillation, and with a door at one end for the removal from time to time of the spent lime. As it is necessary that the lime should be in a heated condition, it is advisable to introduce it into the lime chamber in that condition, or otherwise to heat it before commencing to pass the petroleum vapor through it. From the lime chamber $c$, a trapped return pipe $e$ conducts any condensed vapors back to the still, and another pipe $f$ from the upper part of the lime chamber $c$ at the end farthest from the point of entrance of the goose-neck pipe $b$, conducts the vapors of distillation after passing through the heated lime to the worm or refrigerator $g$, which is constructed in any desired manner and kept at the proper temperature in the usual way. The distillate escapes from the worm by the tail-pipe $h$, between which and the worm $g$ is a standing pipe $k$, through which any fixed gas or uncondensed vapor escapes to the open air or is otherwise disposed of. A trap $i$ prevents the passage of the gas or uncondensed vapor through the tail-pipe $h$.

The operation of my improvement is as follows:—The crude Lima or other similar oil is charged into the still and the distillation is conducted in the usual way. The vapors of distillation passing into the lime chamber $c$ permeate the interstices of the loosely packed heated lime, when the sulphur compounds not separated from the oil by distillation and still remaining in the vapor of distillation and carried over therewith, are broken up and reduced to a condition in which the sulphur is partly taken up by the lime, and the remaining portion of the sulphur compounds which will not or does not combine with the heated lime is broken up and reduced to a condition capable of being acted upon by the plumbate of sodium and acid in a subsequent treatment. During the process just described of passing the hydrocarbon vapor through heated lime, a white smoke-like vapor, which is plainly visible, is evolved, and escapes with the fixed gas and uncondensed vapor through the standing pipe $k$. The appearance of this smoky vapor indicates that the process is progressing satisfactorily, for if no such vapor escapes from the standing pipe, it is an indication that the lime in the lime chamber has not been heated to a sufficiently high degree to produce the desired effect. If, on the other hand, the heat of the lime is too great, this fact is indicated by a darkening of the distillate flowing from the tail-pipe $h$, and by a marked increase in amount and density of the white smoky vapor escaping from the stand pipe. After the vapors have passed through the lime in the cylinder $c$ and have been condensed in the worm $g$, the resulting distillate is somewhat darker than the distillate produced by the ordinary process, and still retains the offensive odor caused by the sulphur compounds. It also differs, however, from the ordinary distillate from sulphur oils in that the chemically combined sulphur has been reduced to what I term its free state of more simple combination with the oil, and is now in a condition to yield to further treatment for the elimination of the sulphur. From the distillate thus produced, a portion of the free sulphur has been removed by the heated lime, but a considerable amount yet remains in combination with the oil, but in an altered condition, so as to be capable of removal by subsequent desulphurizing treatment, depending on the more or less refractory character of the oil. Sometimes the oil after being subjected to the process I have described will yield up its sulphur by steam stilling and subsequent treatment with sulphuric acid and alkali and washing with water, while in other cases it will yield to the ordinary treatment with plumbate of soda, or other substance which has a strong affinity for sulphur. After such subsequent treatment, the distillate which has been subjected to my improved process above described, is substantially free from sulphur, either in its free state or in a state of chemical combination, that is from sulphur or sulphur compounds, and in use will be found to be free also from the offensive odor and objectionable traits before mentioned.

I have described my improved process as commencing with the distillation of crude petroleum, but as it is also applicable to the desulphurizing of petroleum distillate, I use the term "hydrocarbon oil" in the following claims to signify petroleum either in its crude state or after ordinary distillation. I desire also to state that by heated lime in my specification and claims, I mean lime heated to such a degree as will cause the vapor passing from the lime chamber to give off at the stand pipe a whitish smoky vapor in moderate quantity as distinguished from little or no such vapor on the one hand, or a dark colored vapor in considerable quantity on the other hand, it being very difficult to state with much exactness the degree of heat required, that being a matter to be regulated in practice by the indications just referred to.

I claim—

1. The process hereinbefore described of treating hydrocarbon oils which are impregnated with sulphur or sulphur compounds, for the purpose of preparing the oil for the removal of the sulphur by subsequent treatment, consisting in the following steps,—first vaporizing the oil by subjecting it to heat in a still; second passing the vapors thus produced through lime heated to such a temperature that whitish visible vapors are evolved;

and third condensing the vapor after its passage through the heated lime; substantially as described.

2. The process of treating hydrocarbon oils impregnated with sulphur or sulphur compounds, consisting in the following steps,—first vaporizing the oil by subjecting it to heat in a still; second passing the vapors thus produced through lime heated to such a temperature that whitish visible vapors are evolved; third condensing the vapor after its passage through the heated lime; and, lastly, subjecting the resulting distillate to further treatment for the final removal of the sulphur; substantially as described.

In testimony whereof I have hereunto set my hand this 17th day of August, A. D. 1889.

HERMANN KOEHLER.

Witnesses:
J. H. ALEXANDER,
H. C. FOLGER, Jr.